United States Patent
Johns et al.

(10) Patent No.: US 12,266,783 B2
(45) Date of Patent: Apr. 1, 2025

(54) NEGATIVE MASS FOR LEAD-ACID BATTERY ELECTRODES AND LEAD-ACID BATTERY INCLUDING SAME

(71) Applicants: Clarios Germany GmbH & Co. KG, Hannover (DE); CPS Technology Holdings LLC, New York, NY (US)

(72) Inventors: Frank-Thomas Johns, Sarstedt (DE); Cornelia Brendel, Sarstedt (DE); Kavi Loganathan, Glendale, WI (US); Matthew A. Spence, Lindenhurst, IL (US)

(73) Assignees: Clarios Germany GmbH & Co. KG, Hannover (DE); CPS Technology Holdings LLC, New York, NY (US)

( * ) Notice: Subject to any disclaimer, the term of this patent is extended or adjusted under 35 U.S.C. 154(b) by 137 days.

(21) Appl. No.: 17/270,782

(22) PCT Filed: Aug. 30, 2019

(86) PCT No.: PCT/US2019/049166
§ 371 (c)(1),
(2) Date: Feb. 23, 2021

(87) PCT Pub. No.: WO2020/047478
PCT Pub. Date: Mar. 5, 2020

(65) Prior Publication Data
US 2021/0336249 A1     Oct. 28, 2021

Related U.S. Application Data

(60) Provisional application No. 62/725,329, filed on Aug. 31, 2018.

(51) Int. Cl.
*H01M 4/00*  (2006.01)
*H01M 4/20*  (2006.01)
(Continued)

(52) U.S. Cl.
CPC ............ *H01M 4/20* (2013.01); *H01M 4/627* (2013.01); *H01M 50/437* (2021.01);
(Continued)

(58) Field of Classification Search
CPC ......... H01M 4/20; H01M 4/62; H01M 50/437
See application file for complete search history.

(56) References Cited

U.S. PATENT DOCUMENTS

2014/0093775 A1* 4/2014 Hardman ............... H01M 4/583
                                                             252/182.1
2014/0120386 A1   5/2014 Jagannathan et al.
2016/0380261 A1* 12/2016 Atanassova ........... H01M 4/622
                                                             429/213

FOREIGN PATENT DOCUMENTS

CN      101933178 A    12/2010
CN      104685674 A     6/2015
(Continued)

OTHER PUBLICATIONS

Detchkov et al., Organic Expander Composition Used to Improve the Cycle Life and Cold Crank Ability Properties of Lead-acid Batteries Comprising a Blend of Oxylignin and a Kraft Lignin, See the Abstract. (Year: 2001).*
(Continued)

*Primary Examiner* — Anca Eoff
*Assistant Examiner* — Monique M Wills
(74) *Attorney, Agent, or Firm* — Boardman & Clark LLC

(57) ABSTRACT

A blended expander formula for use in the preparation of lead acid battery electrodes is disclosed. The mixture comprises fine particle barium sulfate, a first oxylignin, a second oxylignin, and a carbonaceous material. A method, a negative paste, and a negative electrode including the blended expander mixture are also disclosed. A lead-acid absorbent glass mat battery is further disclosed.

18 Claims, 14 Drawing Sheets

(51) Int. Cl.
*H01M 4/62* (2006.01)
*H01M 50/437* (2021.01)
*H01M 4/02* (2006.01)
*H01M 4/68* (2006.01)
*H01M 50/271* (2021.01)
*H01M 50/296* (2021.01)

(52) U.S. Cl.
CPC ........ *H01M 2004/027* (2013.01); *H01M 4/68* (2013.01); *H01M 50/271* (2021.01); *H01M 50/296* (2021.01)

(56) References Cited

FOREIGN PATENT DOCUMENTS

| | | | | |
|---|---|---|---|---|
| CN | 104769756 A | 7/2015 | | |
| CN | 107820643 A | 3/2018 | | |
| JP | 6202477 B1 * | 9/2017 | ............ | H01M 10/06 |
| WO | WO 0128012 A1 * | 4/2001 | ............ | H01M 4/927 |

OTHER PUBLICATIONS

Inagaki et al., Lead Acid Battery, Sep. 2017, See the Abstract. (Year: 2017).*

* cited by examiner

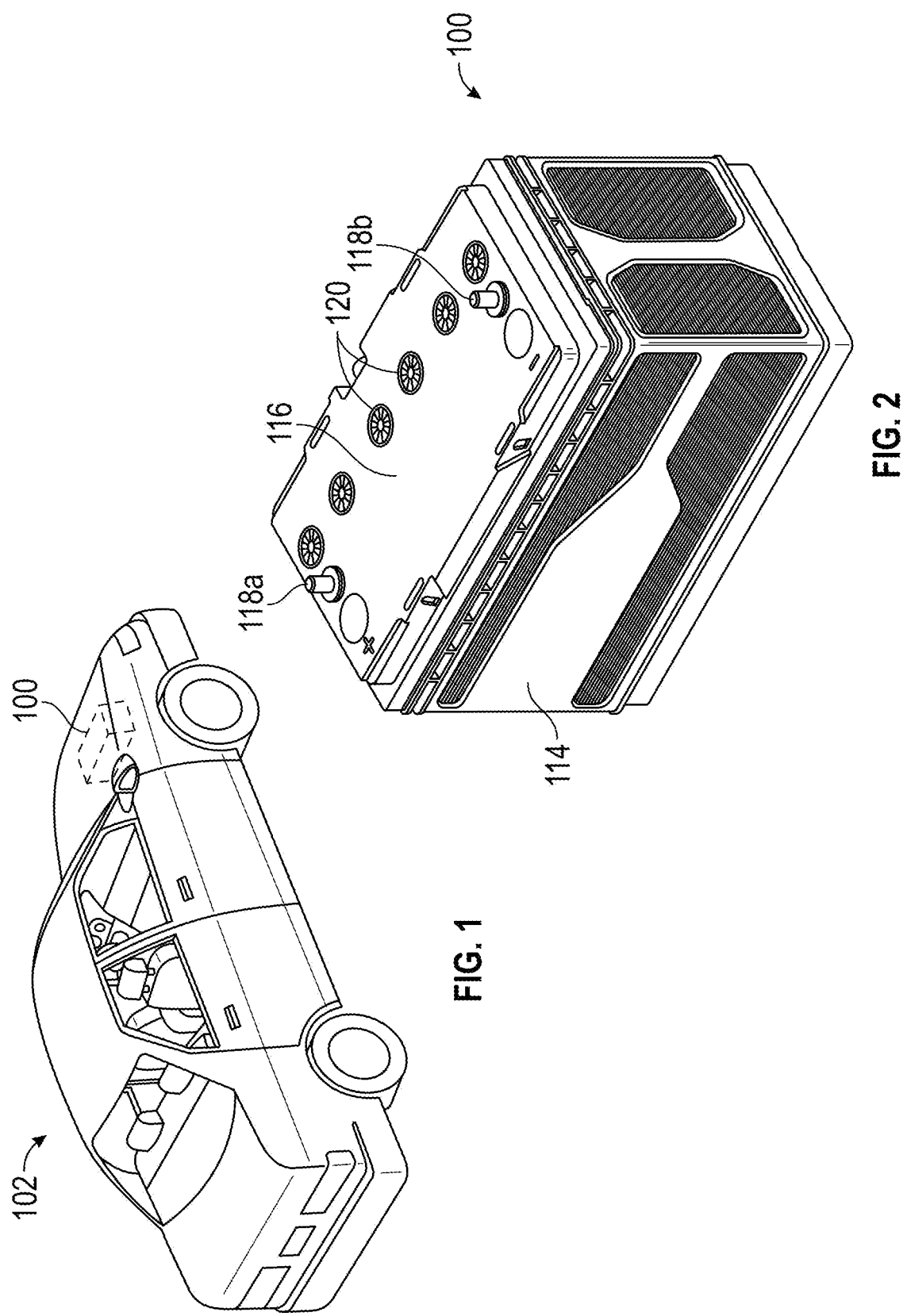

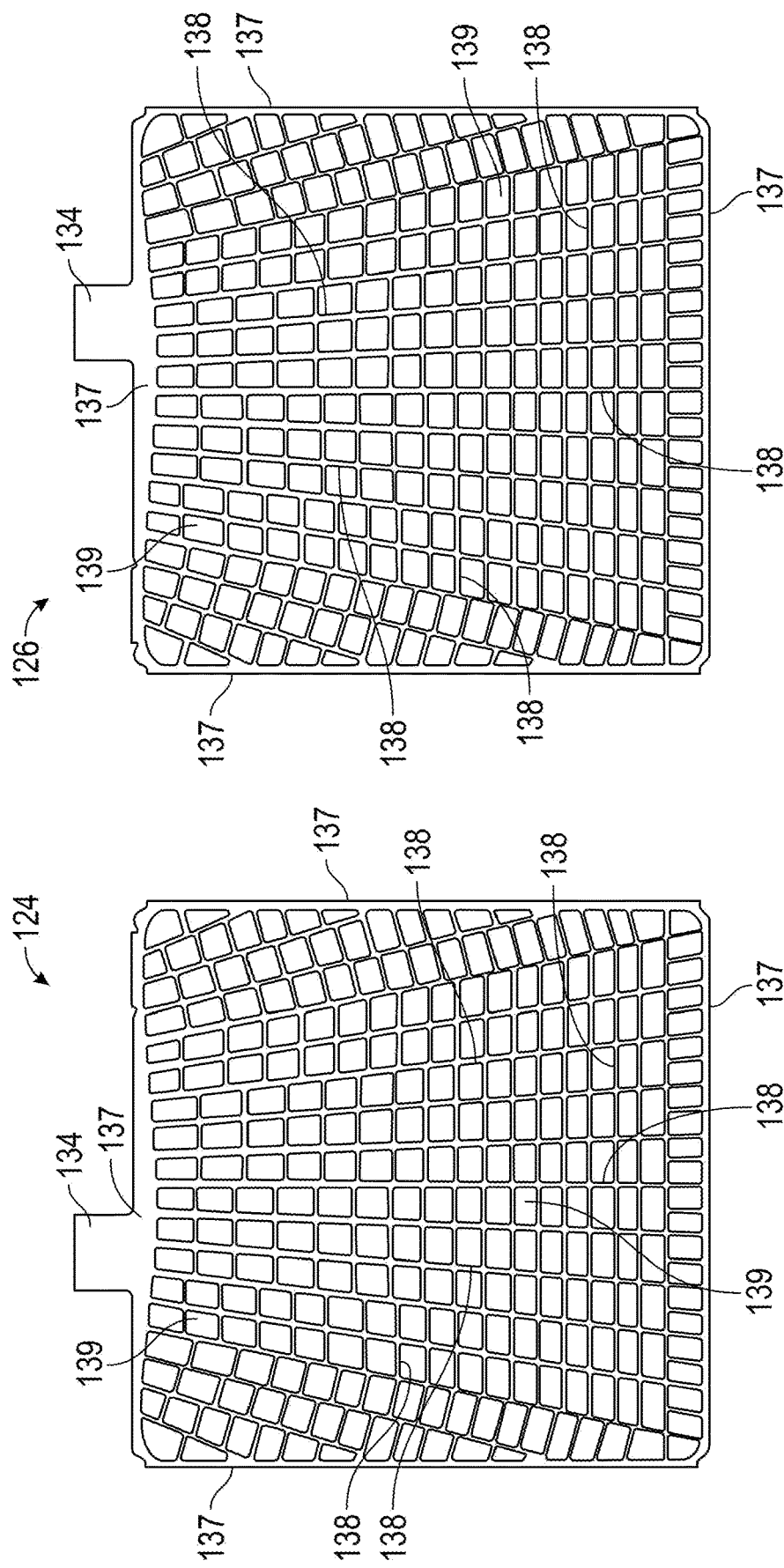

Test Recipes Matrix - Components and composition

| Recipe | Unit | Control | New A | New B | New C | New D |
|---|---|---|---|---|---|---|
| Component | | | | | | |
| Lead Oxide | Kg | 800 | 800 | 800 | 800 | 800 |
| Polymer-Fibers | Kg | 0.87 | 0.87 | 0.87 | 0.87 | 0.87 |
| Organic 1-Oxylignin 1 | % | - | 0.30 | 0.30 | 0.30 | 0.30 |
| Organic 2-Oxylignin 2 | % | 0.10 | 0.15 | 0.10 | 0.15 | 0.10 |
| Organic 3-Humic Acid | % | 0.10 | - | - | - | - |
| Fine Particle Barium Sulfate | % | 1.0 | 1.0 | 1.0 | 1.0 | 1.0 |
| Carbonaceous 1-Carbon 1 | % | - | - | 0.2 | 0.3 | 0.4 |
| Carbonaceous 2-Carbon 2 | % | 0.16 | 0.16 | - | - | - |

FIG. 10

Test Recipes - Initial Electrical Test Data

| Recipe | | Spec. (VDA) | Control | New A | New B | New C | New D |
|---|---|---|---|---|---|---|---|
| Component | Unit | | | | | | |
| Internal Resistance | [mOhm] | | 3.05 | 3.12 | 3.07 | 3.06 | 3.04 |
| 1. Capacity ($C_{20}$) | [Ah] | 66.5 | 72.6 | 68.8 | 73.1 | 72.6 | 74.0 |
| 1. Cold Cranking $U_{10}$ | [V] | 7.5 | 7.59 | 7.46 | 7.61 | 7.59 | 7.63 |
| 1. Cold Cranking ($t_{6V}$) | [s] | 111 | 150 | 121 | 132 | 137 | 132 |
| 2. Capacity ($C_{20}$) | [Ah] | 70 | 74.5 | 73.4 | 75.4 | 75.3 | 75.7 |
| 2. Cold Cranking ($U_{10}$) | [V] | 7.5 | 7.63 | 7.59 | 7.70 | 7.69 | 7.65 |
| 2. Cold Cranking ($t_{6V}$) | [s] | 111 | 151 | 141 | 141 | 148 | 133 |
| 3. Capacity ($C_{20}$) | [Ah] | / | 74.7 | 74.5 | 75.1 | 75.4 | 75.8 |
| Reserve Capacity | [min] | 120 | 139 | 144 | 145 | 146 | 146 |
| Cold Cranking $U_{30}$ @ -18 (SAE) | [V] | 7.2 | 7.25 | ".26 sec" | 7.27 | 7.33 | 7.27 |
| Static Charge Acceptance (EN) | [A] | 17.5 | 19.2 | 10.1 (failed) | 16.4 (failed) | 18.2 | 19.4 |
| Endurance: 17.5% Cycling | [pass/fail] | AK3.4 | Average | Average | Average | Excellent | Low |
| Endurance: 50% Cycling | [pass/fail] | 50%DoD | 360 cycles | Failed | OK | 360 cycles | OK |
| Life Test (J2801) | weeks | >12 | 13 weeks | | | 20 weeks | |
| Water Consumption | [g/Ah] | Wc w/42d | 1.60 | 1.23 | 1.14 | 1.44 | 1.60 |
| Water Consumption | | Wc w/84d | fail | | | 2.05 | |

FIG. 11

NEGATIVE MASS FOR LEAD-ACID BATTERY ELECTRODES AND LEAD-ACID BATTERY INCLUDING SAME

CROSS-REFERENCE TO RELATED APPLICATIONS

This application is a national stage application filed under 35 U.S.C. 371, of International Patent Application No. PCT/US2019/049166, filed Aug. 30, 2019, entitled "NEGATIVE MASS FOR LEAD-ACID BATTERY ELECTRODES AND LEAD-ACID BATTERY INCLUDING SAME", which claims priority to and the benefit of U.S. Provisional Patent Application No. 62/725,329, filed Aug. 31, 2018, entitled "NEGATIVE MASS FOR LEAD-ACID BATTERY ELECTRODES & LEAD-ACID BATTERY INCLUDING SAME", the entire contents of both are hereby incorporated by reference herein in their entireties.

FIELD

The present inventions relate to the field of batteries. The present inventions more specifically relate to the field of lead-acid batteries.

BACKGROUND

Lead-acid batteries are known. Lead-acid batteries are made up of plates of lead and separate plates of lead dioxide, which are in contact with an electrolyte solution. The lead, lead dioxide and electrolyte provide a chemical means of storing electrical energy which can perform useful work when the terminals of a battery are connected to an external circuit.

One type of lead-acid battery is an absorbent glass mat (also referred to as "AGM") lead-acid battery which is a sealed (e.g., maintenance-free), or more specifically a valve regulated battery, in which the electrolyte is absorbed and retained in a mat that is wrapped around or interleaved with an electrode(s) or plate(s). AGM lead-acid batteries are recombinant batteries, that is, $H_2$ and $O_2$ generated during charging are recombined to water in the battery.

AGM lead-acid batteries are advantageous over traditional starting, lighting and ignition (SLI) batteries, in that they are better suited to providing power in a vehicle with numerous electronic features or plug-in accessories. AGM batteries are also a preferred solution for fuel saving start-stop vehicle technology.

Start-stop vehicles can place various demands on a battery. Vehicles are also increasing in the electrical load of components, for which the electrical load must be supported during an engine stop event. Vehicle manufacturers are seeking a cost effective, reliable energy storage solution that ensures a seamless customer experience. Therefore there is a need for consistent reliable performance from a lead-acid battery. There is also a need for a robust battery which can support additional prolonged/intermittent loads and support optimal duration and frequency of stop events. To this end, a need exists for a lead-acid battery which provides improved cycling performance, reduced water loss, and improved endurance over existing devices. Accordingly, a need exists for an AGM lead-acid battery with improved performance over existing devices.

SUMMARY

A lead-acid storage battery is disclosed which has improved performance.

According to one or more examples of embodiments, the performance of a lead-acid battery, including for example absorbent glass mat (AGM) and starting-lighting-ignition (SLI) lead-acid batteries, can be improved by the addition of additives to the negative active material. These additives, collectively known as expanders, include, in one or more examples of embodiments described herein, fine particle barium sulfate, two organic compounds, and a carbonaceous material (e.g., carbon black, graphite, graphene, etc.). The specific dosage and materials selected impart improved performance properties to the battery. The enhanced properties may include, but are not limited to cycling performance (measured by 17.5% depth of discharge cycling, 50% depth of discharge cycling, WIT (microhybrid test)) and reduced water loss or improved service life (e.g., J2801 charging at elevated temperature). As a result, endurance of the battery is improved. This may improve the ability to function in an extended application, namely stop-start micro hybrid operation for fuel saving during vehicle operation.

In one or more examples of embodiments, to allow processing, the multiple expander components may be pre-mixed to generate an expander blend. The expander blend is then used to make a battery paste. This processing may improve homogeneity and dispersion in the final battery paste. Pre-mixing may also overcome the tendency of the individual components to form lumps or segregate. Alone, the organic materials have hygroscopic nature and tend to pick up moisture from the air to make lumps or tar-like substances. The carbonaceous material may be supplied pelletized to reduce volume and dust, but by pre-mixing these pellets may be broken up to improve effectiveness in the paste mix.

Accordingly, a blended expander mixture for use in the preparation of lead acid battery electrodes is disclosed. The mixture comprises fine particle barium sulfate, a first oxylignin, a second oxylignin, and a carbonaceous material.

A blended expander mixture for use in the preparation of lead acid battery electrodes is also disclosed which comprises fine particle barium sulfate, a first oxylignin having a first molecular weight, a second oxylignin having a second molecular weight which is different from the first molecular weight, and a carbonaceous material.

An active material paste for use in the negative electrode of a lead-acid absorbent glass mat battery is disclosed. The paste comprises a water, leady oxide, polymer fiber, sulfuric acid, and a blend containing fine particle barium sulfate, a first oxylignin, a second oxylignin, and a carbonaceous material.

An active material paste for use in the negative electrode of a lead-acid absorbent glass mat battery is also disclosed that comprises: water, leady oxide, polymer fiber, sulfuric acid, and a blend comprising fine particle barium sulfate, a first oxylignin having a first molecular weight, a second oxylignin having a second molecular weight which is different from the first molecular weight, and a carbonaceous material.

A negative electrode for use in a lead-acid absorbent glass mat battery is disclosed. The electrode comprises a grid and negative paste covering or in electrical contact with the grid or current collector, the negative paste comprising water, leady oxide, polymer fiber, sulfuric acid, and a blend containing fine particle barium sulfate, a first oxylignin, a second oxylignin, and a carbonaceous material.

A negative electrode for use in a lead-acid absorbent glass mat battery is also disclosed that comprises a current collector and negative paste covering the current collector, the negative paste comprising water, leady oxide, polymer fiber, sulfuric acid, and a blend comprising fine particle barium sulfate, a first oxylignin having a first molecular weight, a second oxylignin having a second molecular weight which is different from the first molecular weight, and a carbonaceous material.

A method of making a negative electrode for a lead acid battery is disclosed. The method includes the steps of: pre-blending the expander either wet or dry, preparing a paste, applying paste to the grid, and curing the paste on the grid.

A lead-acid battery is disclosed. The lead-acid battery includes a container with a cover. The container includes one or more compartments. One or more cell elements are provided in the one or more compartments. The one or more cell elements comprise a positive electrode, the positive electrode having a positive current collector or grid and a positive active material in contact with or on the positive grid; a negative electrode, the negative electrode having a current collector or grid and negative paste covering the grid, the negative paste comprising water, leady oxide, polymer fiber, sulfuric acid, and a blend comprising fine particle barium sulfate, a first oxylignin having a first molecular weight, a second oxylignin having a second molecular weight which is different from the first molecular weight, and a carbonaceous material; and an absorbent glass mat separator between the positive electrode and the negative electrode. Electrolyte is provided within the container. One or more terminal posts extend from the container or the cover and are electrically coupled to the one or more cell elements.

These and other features and advantages of devices, systems, and methods according to this invention are described in, or are apparent from, the following detailed descriptions of various examples of embodiments.

BRIEF DESCRIPTION OF DRAWINGS

Various examples of embodiments of the systems, devices, and methods according to this invention will be described in detail, with reference to the following figures, wherein:

FIG. 1 is a perspective view of a vehicle for use with an absorbent glass mat battery according to one or more examples of embodiments described herein.

FIG. 2 is a perspective view of an absorbent glass mat battery according to one or more examples of embodiments described herein.

FIG. 6 is an elevation view of an example battery grid or current collector for use with the absorbent glass mat battery shown in FIGS. 2-4.

FIG. 7 is an additional elevation view of an example battery grid or current collector for use with the absorbent glass mat battery shown in FIGS. 2-4.

FIG. 10 shows a chart of the composition or formulas of various expander recipes of negative active mass tested.

FIG. 11 is a chart showing data of initial electrical testing according to various industry standard tests for batteries having the compositions or formulas shown in FIG. 10.

Figure 3:
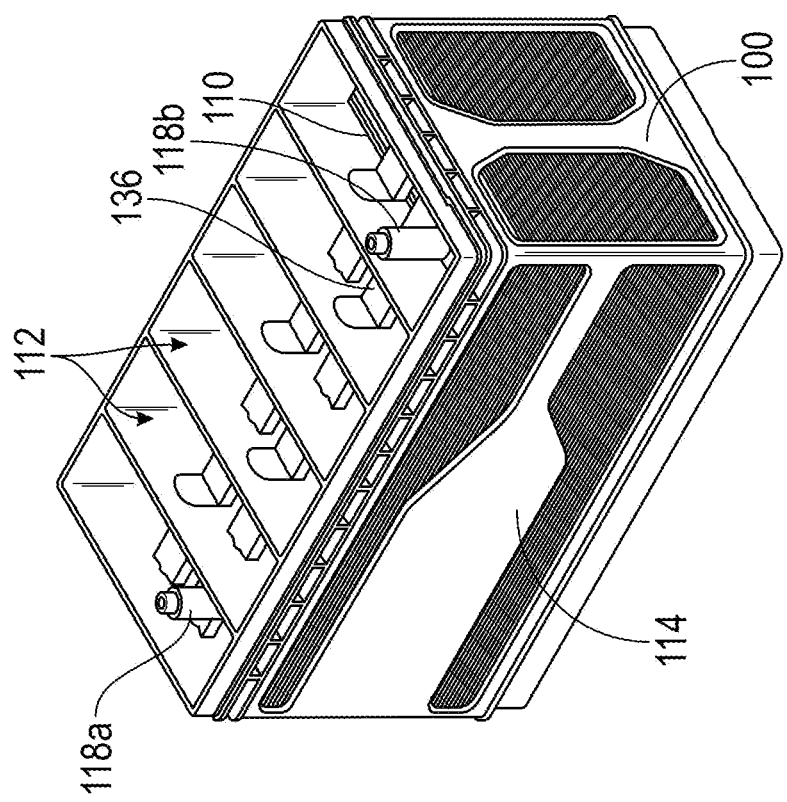
FIG. 3 is a perspective view of the absorbent glass mat battery shown in FIG. 2, with the cover removed.

It should be understood that the drawings are not necessarily to scale. In certain instances, details that are not necessary to the understanding of the invention or render other details difficult to perceive may have been omitted. It should be understood, of course, that the invention is not necessarily limited to the particular embodiments illustrated herein.

DETAILED DESCRIPTION

Referring to the Figures, a battery 100 is disclosed, and in particular a rechargeable battery, such as, for example, a lead-acid battery. According to one or more examples of embodiments, the battery 100 is a lead-acid storage battery. Various embodiments of lead-acid storage batteries may be either sealed (e.g., maintenance-free) or unsealed (e.g., wet). According to one or more examples of embodiments, the lead-acid storage battery 100 is preferably a sealed lead-acid battery or AGM lead-acid battery and, to this end, may include an absorbent glass mat 108 (referred to interchangeably herein as "AGM"). While specific examples are described and illustrated, the battery 100 may be any secondary battery suitable for the purposes provided. For example, the battery may be a lead-acid SLI battery.

A battery 100 is provided and shown in a vehicle 102 in FIG. 1. Referring to FIGS. 2-5, the illustrated battery 100 is an AGM lead-acid battery having positive and negative plates 104, 106 which are separated by an absorbent glass mat 108 that absorbs and holds the battery's acid or electrolyte and prevents it from flowing freely inside the battery 100. The working electrolyte saturation is at some value below 100% saturation to allow recombinant reactions of hydrogen and oxygen. The AGM lead-acid battery 100 includes several cell elements 110 which are provided in one or more separate compartments 112 of a container or housing 114. The element stack 110 may be compressed during insertion reducing the thickness of the separator 108. A cover 116 is provided for the container or housing 114 and may be sealed to the container 114. In various embodiments, the container 114 and/or cover 116 includes battery terminals 118. The battery cover 116 may also include one or more filler hole caps and/or vent assemblies 120 (see FIG. 2).

Figure 4:
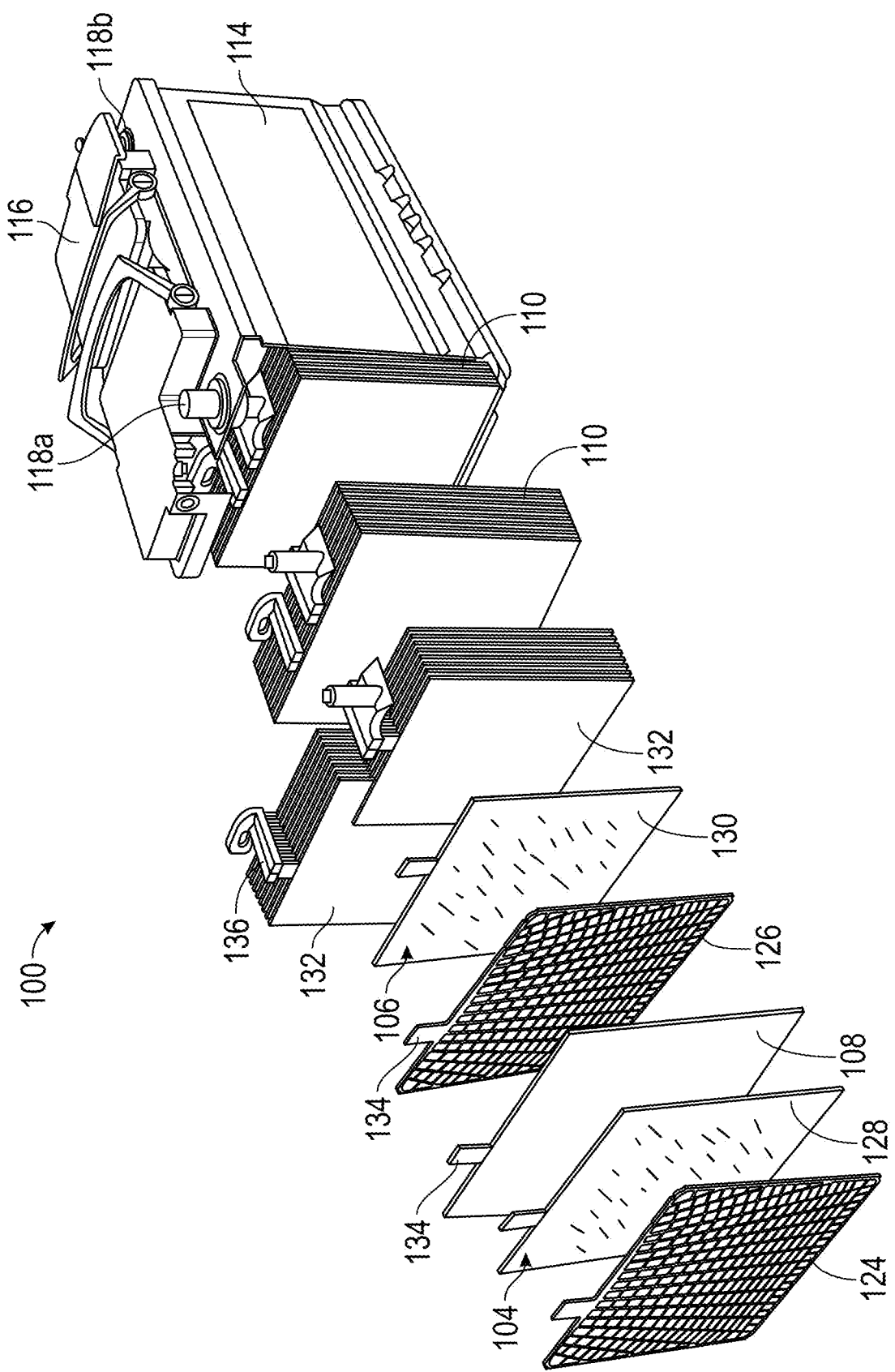
FIG. 4 is an exploded perspective view of an absorbent glass mat battery according to one or more examples of embodiments described herein.

Referring to FIG. 4, the plates 104, 106 or electrodes include electrically-conductive positive or negative grids 124, 126 or current collecting members. Positive paste 128 is provided on or in contact with the positive grid 124 or current collecting member or substrate and negative paste 130 is provided on or in contact with the negative grid 126 or current collecting member or substrate. More specifically, the positive plate 104 or electrode includes a positive grid or current collector 124 having or supporting a positive active material or paste 128 thereon, and in some examples of embodiments may include a pasting paper or a woven or non-woven sheet material comprised of fibers (e.g., a "scrim") 132; and the negative plate 106 or electrode includes a negative grid 126 or current collector having or supporting a negative active material or paste 130 thereon, and in some examples of embodiments may include a pasting paper or scrim 132. Positioned between the positive and negative plates 104, 106 is a separator 108. In a retained electrolyte-type battery 100 such as described herein, the separator 108 may be a porous and absorbent glass mat (AGM). In some examples, the absorbent glass mat 108 may also be used with an additional separator (not shown); various common commercially available separators are known in the art, such as but not limited to polyethylene, glass, rubber, and so forth.

Figure 5:
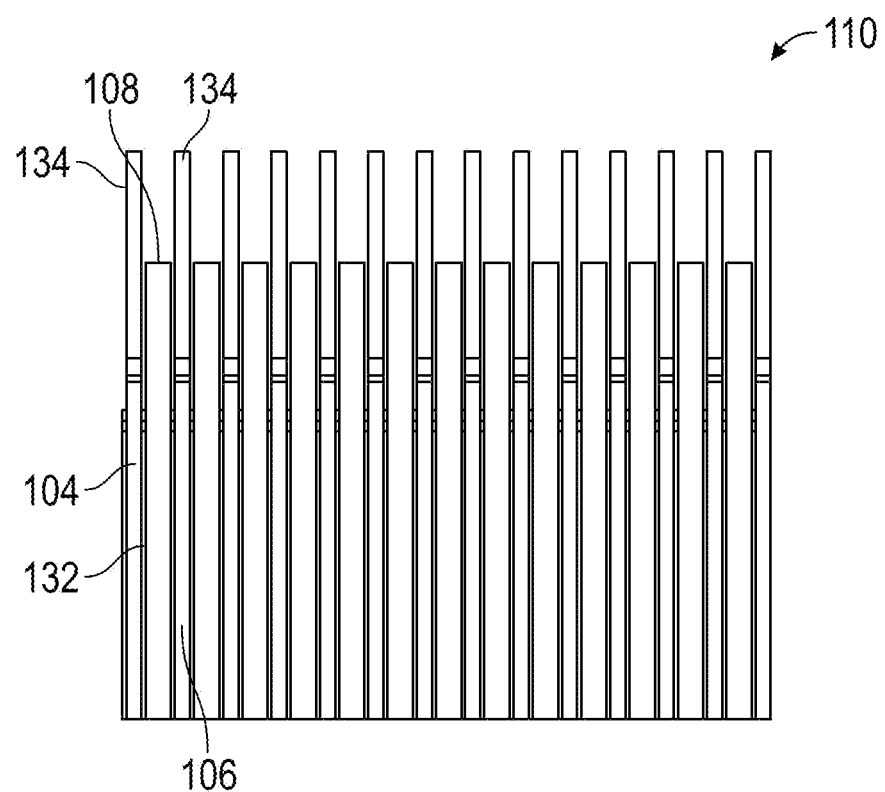
FIG. 5 is a partial, side elevation view of a cell element according to one or more examples of embodiments for use with the absorbent glass mat battery shown in FIGS. 2-4.

A plurality of positive plates 104 or electrodes and a plurality of negative pates 106 or electrodes (with separators 108) generally make up at least a portion of the electrochemical cell 110 (see FIGS. 3-5). As indicated, each plate set or cell 110 may include one or more positive plates 104 and one or more negative plates 106. Thus, the battery 100 includes a positive plate 104 and a negative plate 106, and more specifically a plurality of positive plates 104 and a plurality of negative plates 106. Referring to FIGS. 3-4, a plurality of plate sets or books or cell elements 110 may be electrically connected, e.g., electrically coupled in series or other configuration, according to the capacity of the lead-acid storage battery 100. Each current collector or grid has a lug 134 (see FIGS. 4-8). In FIGS. 3-4, one or more cast-on straps or intercell connectors 136 are provided which electrically couple the lugs 134 of like polarity in a plate set or cell element 110 and to connect other respective plate sets or cell elements 110 in the battery 100. One or more positive terminal posts 118*a* and one or more negative terminal posts 118*b* (FIGS. 2-4) may also be provided. Such terminal posts 118 typically include portions which may extend through the cover and/or container wall, depending upon the battery design. It will be recognized that a variety of terminal arrangements are possible, including top, side, front or corner configurations known in the art.

A plurality of positive electrodes or plates 104 and negative electrodes or plates 106 may be provided in stacks or plate sets or cell elements 110 for producing a battery having a predetermined voltage, for example a 12-volt battery in a vehicle 102. The number of cell elements 110 or plate groups or plate sets may be varied. It will also be obvious to those skilled in the art after reading this specification that the size and number of plates 104 and/or 106 in any particular group (including the size and number of the individual grids), and the number of groups used to construct the battery 100 may vary depending upon the desired end use.

As described in various embodiments herein, the positive and negative plates 104, 106 are paste-type electrodes (FIG. 4). Thus, each plate 104, 106 comprises a grid 124, 126 pasted with active material 128, 130. More specifically, the paste-type electrode includes a grid which acts as a substrate and an electrochemically active material or paste is provided in contact with and/or on the substrate. The grids, including a positive grid 124 and a negative grid 126, provide an electrical contact between the positive and negative active materials or paste 128, 130 which may serve to conduct current.

Figure 8:
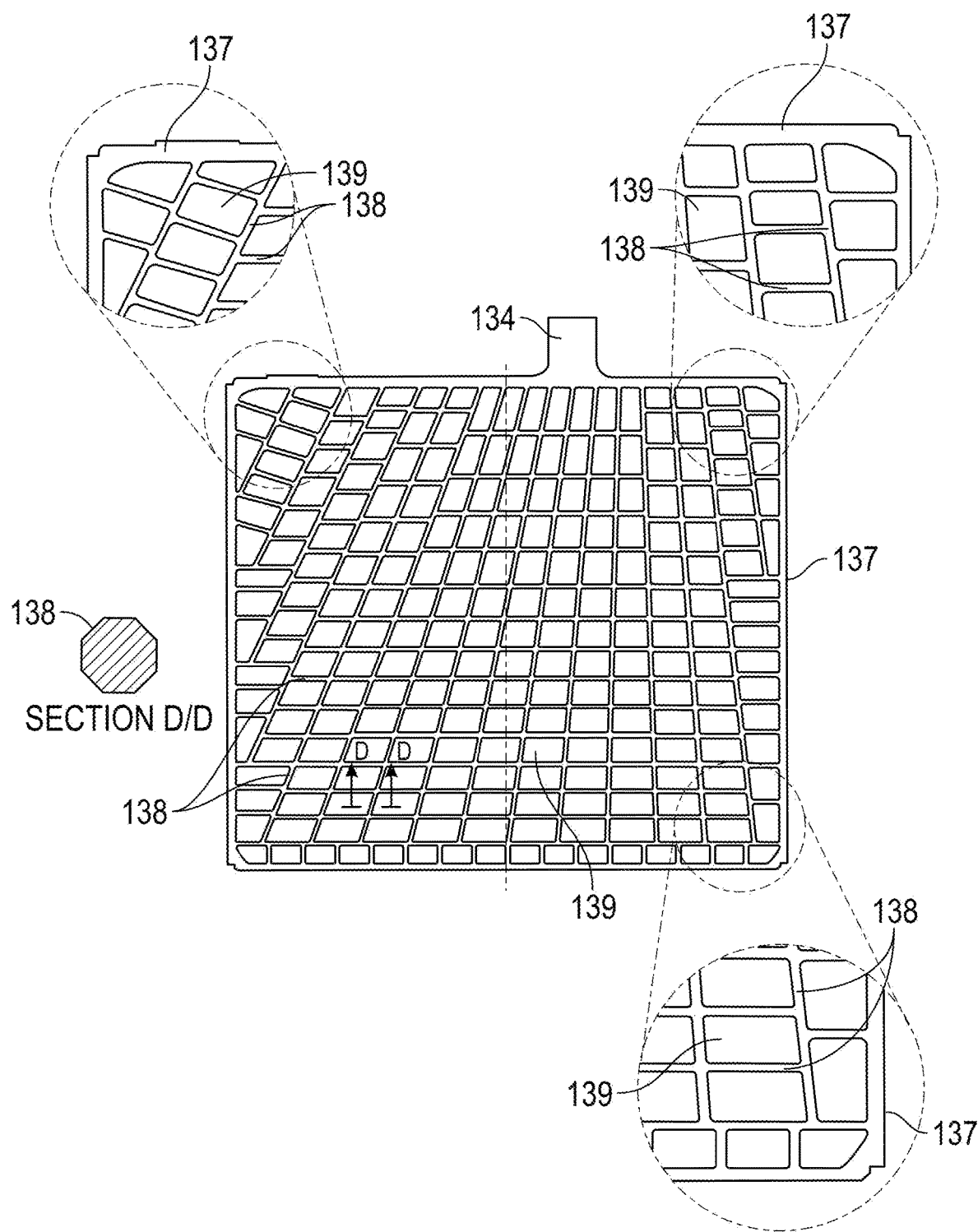
FIG. 8 is an elevation view of an alternative example battery grid or current collector for use with the absorbent glass mat battery shown in FIGS. 2-4, showing section details of the illustrated grid.

Referring to FIGS. 6-8, in one or more examples of embodiments, the grids 124, 126 may be the same or similar. To this end, the grids 124, 126 may be stamped or punched fully framed grids having a frame 137 and a radial arrangement of grid wires 138 forming a pattern of open spaces 139. In one example, both the positive grids 124 and the negative grids 126 may have such an arrangement. However, it is contemplated that the grids 124, 126 may differ. For example, the positive grid 124 may be a stamped or punched fully framed grid having a radial arrangement of grid wires 138 and the negative grid 126 may be concast or, for example, expanded metal or gravity cast. Various examples of grids 124, 126 suitable for use with the inventions described herein are shown and described in U.S. Pat. Nos. 5,582,936; 5,989,749; 6,203,948; 6,274,274; 6,953,641 and 8,709,664, which are hereby incorporated by reference herein. While specific examples of grid wire 138 arrangements and grid types are described for purposes of example, the invention is not limited thereto and any grid structure or arrangement suitable for the purposes of the battery 100 may be substituted in place of the described grids 124, 126. For example, a negative grid 126 having a different or improved profile may be provided. In one or more examples of embodiments, a negative grid 126 having a profile similar to that shown in U.S. Pat. No. 9,130,232, which is hereby incorporated by reference herein (and also shown in FIG. 8), may be provided. In other examples of embodiments, the grid may be a punched grid, a continuously cast (concast) grid, an expanded metal grid, and so forth. In some examples of embodiments, the grid may also include surface roughening or may be subjected to one or more different surface treatments (e.g., solvent, surfactant and/or steam cleaning), such as may be used to improve paste adhesion among other benefits.

According to one or more examples of embodiments, the grid 124 material may be composed of lead (Pb) or a lead alloy (or any suitable conductive substrate, i.e. carbon fiber). Thus while "grid" is used for purposes of discussion and illustration herein, one of skill in the art will appreciate that various materials may make up the current collector or substrate having the features described herein. The negative grid 126 may be composed of the same or similar material to the positive grid 124. It is contemplated, however, that material composition may also vary between the positive grid 124 and the negative grid 126. In one example of embodiments, the positive and negative grids 124, 126 may also be formed of different thickness and/or different lead alloy and/or different material. However, it is contemplated that the grids 124, 126 may be of the same thickness and/or alloy and/or material. The foregoing properties or characteristics of each grid may be varied based upon desired manufacturing and performance parameters. For instance, thickness may be determined based upon manufacturing requirements, such as for instance, minimum requirements for paste adhesion, or other suitable parameters. While specific examples are provided for purposes of illustration, variations thereon may be made to provide grid dimensions suitable for the particular application.

In more detail, the positive electrode or plate 104 may contain a metal (e.g., lead or lead alloy) current collector or grid 124 with lead dioxide active material or paste 128 thereon. Examples of lead-containing compositions which may be employed in the positive paste 128 include, but are not limited to, finely-divided elemental Pb, PbO ("litharge"

or "massicot"), Pb3O4 ("red lead"), PbSO4 ("Lead sulfate" with the term "PbSO4" being defined to also include its associated hydrates, and basic sulfates: 1PbO·PbSO4, 3PbO·PbSO4·H2O, 4PbO·PbSO4), and mixtures thereof. Different materials may be used in connection with the lead-containing paste composition, with the present invention not being restricted to any particular materials or mixtures (added fibers, or other constituents). These materials may be employed alone or in combination as determined by numerous factors, including for example, the intended use of the battery 100 and the other materials employed in the battery.

The negative electrode or plate 106 may be composed of a metal (e.g., lead or lead alloy) current collector or grid with a spongy lead active material or paste 130 thereon. The negative paste 130 may, in a preferred embodiment, be substantially similar to the positive paste 128 but may also vary. Example lead-containing compositions which may be employed in the negative paste 130 include, but are not limited to, finely-divided elemental Pb, PbO ("litharge" or "massicot"), Pb3O4 ("red lead"), PbSO4 ("lead sulfate" with the term "PbSO4" being defined to also include its associated hydrates, and basic sulfates: 1PbO·PbSO4, 3PbO·PbSO4·H2O, 4PbO·PbSO4), and mixtures thereof.

Various methods are known for making leady oxide, such as for example, Barton Pot method (thermal) and Ball Mill method (attrition). The particle size distribution of the oxide that results from the two processes may be different.

In addition, the negative active material 130 may also contain fiber and/or expander additives which may help maintain the active material structure and improve performance characteristics, among other things. Different materials may be used in connection with the lead-containing paste composition. These materials may be employed alone or in combination as determined by numerous factors, including for example, the intended use of the battery 100 and the other materials employed in the battery.

According to one or more examples of embodiments, the negative active material or paste 128 and/or 130 may have an improved composition or recipe or formula over traditional AGM batteries. The improved composition may also be applicable to automotive SLI (starting-lighting-ignition) batteries. In particular, a novel negative active mass recipe or formula is disclosed. Preferably, the active material composition or recipe provides a changed, or improved, cycling performance, as well as reduced water loss and improved endurance over existing AGM batteries.

Accordingly, in one example, the negative active material 130 or negative mass may be improved. The negative active mass may include one or more additives. To this end, the negative mass may be prepared from leady oxide, polymer fiber, water, sulfuric acid and expander. The expander contains components that may ultimately improve the operating performance of the battery, often tailored for a specific duty (i.e. automobile starting, motive power, stationary UPS).

In current existing AGM batteries, humic acid may be used as an additive or as a component of the expander. Unfortunately, humic acid is known to contain iron amongst other metal impurities detrimental to the functioning of the battery, which lead to problems of early battery failure. A consistent quality or make up of humic acid is also difficult to control, as it varies based upon where the raw materials may be mined or extracted. Trace impurities in the humic acid can poison the electrochemical system resulting in battery failure and/or poor performance. Therefore, a need exists for an expander which avoids one or more of these issues.

The novel negative active mass described herein includes a combination of several expander materials that impart improvements to the battery performance over existing art. For example, one or more of the novel expander materials described herein below impart desirable water consumption and electrical performance of the battery. In addition, the organic expander components also may impact processibility, acting as dispersant in the negative paste, helping during paste mixing and application to the grid, and overcoming the tendency of high surface area carbonaceous material to make the paste unworkable, among other advantages.

In this regard, one or more of the following additives may be included individually or in combination (e.g., as an addition to the negative paste 130 or included in the negative paste mass):

Fine particle Barium Sulfate (BaSO4); where the particle size is 0.2-1.1 micrometers, for the mean D50, with D90<3.0; more specifically D50 average diameter 0.6 to 0.8 micrometers, D90<2 um;

A fine particle barium sulfate which is added at a dosage 0.75 to 1.25 wt %, more specifically 0.8 to 1.0 wt %, wt % with respect to the total mass of leady oxide.

A fine particle barium sulfate manufactured by precipitation from a barium rich liquid. i.e. "Precipitated" type Barium sulfate of enhanced purity, where barium content is >99.0% and transition metal (Fe, Mn, Cu, Ni) impurities are below 10 ppm.

Two (2) organic expanders (e.g., oxylignins), including a combination of an organic from hardwood pulping and an organic which is derived from a soft wood; more specifically one or more of:

{oxylignin1} which may be any one or more of the following:

1. A first organic chemical component, specifically an oxylignin, with mean molecular weight in the range 1500 to 3500 (g/mol), more specifically 2000 to 3000 g/mol.
2. A first oxylignin which is added at a dosage of 0.15 to 0.45 wt % with respect to leady oxide weight, more specifically 0.2 wt % to 0.4 wt %, even more specifically 0.25 to 0.35 wt %.
3. A first organic, oxylignin, with pH>11.0 for 3 wt % aqueous solution, more specifically pH 11.5 to 12.5.
4. A first oxylignin with 2 to 3% sulfonate sulfur content (sulfonic sulfur), more specifically 2.2 to 2.6% sulfonate sulfur content.
5. A first oxylignin with total sulfur content less than 10%, more specifically less than 5.0% total sulfur content.
6. A first oxylignin with total sodium content 15 to 25 wt %, more specifically 18 to 22 wt %

In a preferred example of embodiments, the first oxylignin has all of the foregoing properties.

{oxylignin2} which may be any one or more of the following:

7. A second oxylignin, with mean molecular weight 5000 to 15000 g/mol, more specifically mean molecular weight 6000 to 9000 g/mol.
8. A second oxylignin which is added at a dosage of 0.05 to 0.35 wt % with respect to leady oxide weight, more specifically 0.1 wt % to 0.25 wt %, even more specifically 0.12-0.17 wt %.
9. A second oxylignin with 1.0 to 7.5% sulfonate sulfur content, more specifically 1.4 to 2.5%, sulfonate sulfur content.
10. A second oxylignin with total sulfur content less than 5 wt %, more specifically less than 3.0 wt %.

11. A second oxylignin with total sodium content 5 to 10 wt %, more specifically 7.0 to 8.0 wt %.

In a preferred example of embodiments, the first oxylignin has all of the foregoing properties.

- Carbonaceous material (e.g. Carbon black, graphite, graphene, etc.) with high specific surface area, e.g., greater than 80 $m^2/g$ (square meters per gram).
- At least one carbonaceous material, with specific surface area measured by nitrogen absorption isotherm of 180 to 300 $m^2/g$, more specifically 205 to 265 $m^2/g$.
- At least one carbonaceous material with structure measured by oil absorption (OAN) of between 90 and 150 ml/100 g; more specifically 100 to 130 ml/100 g.
- At least one carbonaceous material with total levels of transition metal (including Iron, Copper, Manganese, Nickel) impurities below 50 ppm.
- At least one carbonaceous material which is added at a dosage of 0.05 to 0.45 wt % with respect to leady oxide weight; more specifically 0.1 wt % to 0.30 wt %, even more specifically 0.20 to 0.40 wt %; for example, carbon black may be provided in a higher dosing than known formulations.

In a preferred example of embodiments the carbonaceous material has all of the foregoing properties. In some examples, more than one carbonaceous material may be used. For example two different carbons may be added to the mixture or formula.

Barium sulfate may act as a crystal nucleation site, being practically isomorphous with lead sulfate. It promotes an open pore structure in the electrode. By providing many seed crystal sites the average size of the lead sulfate crystals formed during battery discharge is reduced, which permits a more effective recharge, resulting in good cycling life.

The organic components described herein are preferably manufactured organics. That is, the components may be derived from wood lignin, rather than mined from the ground. Lignin is a naturally occurring aromatic polymer from wood that has a highly branched, three dimensional phenolic structure including three main phenylpropane units, namely p-coumaril, coniferyl and sinapyl. Organic molecules defined as "oxylignin" are lignin derivatives in an oxidized state. These are generally produced from the byproduct of wood pulping for paper making. Oxylignins are characterized as acid insoluble and alkali dispersible lignin sulfonic acid or lignin sulfonate salt compounds, i.e. sodium lignosulfonate, as well as calcium salt, aluminum salt, zinc salt, etc. Oxylignins may improve the structure of the negative active material after electrochemical formation. This may improve cold cranking performance and cyclability of the battery. There also may be an absorption interaction between the organic molecules and the carbonaceous material. As indicated above, preferably, two oxylignins are used. The two oxylignins are of different molecular weight, among other properties.

Carbon may impart color to the negative plate, e.g., to distinguish positive from negative plates. In this application, it may add conductivity to the active material and increase the surface area of the active material. The carbon may be supplied fluffy or pelletized; in the case of pelletized carbon some shear force may be required to break up the pellets.

In one or more examples of embodiments, to allow processing, the multiple expander components may be pre-mixed to generate an expander blend. The expander blend is then used to make a battery paste. This processing may improve homogeneity and dispersion in the final battery paste. Pre-mixing may overcome the tendency of the individual components to form lumps or segregate. Alone, the organic materials have hygroscopic nature and tend to pick up moisture from the air to make lumps or tar-like substances. The carbonaceous material may be supplied pelletized to reduce volume and dust, but by pre-mixing these pellets may be broken up by pre-mixing to improve effectiveness in the paste mix.

To this end, a further refinement of the formulation may be to blend together the expander components prior to addition to the leady oxide. This can be achieved, for example, in two ways, dry milling or wet slurry preparation. The dry milling operation may break up agglomerates, intentional (pelletized carbon) and/or natural (organic material agglomerates). The milling may act to homogenize components of vastly different density, e.g. low density carbon with high density barium sulfate. During/after milling the organic may act as a binder between carbon, itself, and barium sulfate. Advantageously, this blended powder may not segregate in transport, and is easier to disperse during preparation of the high density leady paste mix.

Wet slurry preparation may create a suspension of the expander components in water. Effective dispersion of the components can be achieved using mechanical agitation, ultrasonic mixing, etc. The temperature of the slurry can be increased to facilitate dispersion (10° C. to 100° C.), the pH of the slurry can be increased to facilitate dispersion by addition of base (e.g. NaOH).

One example of a blend of the foregoing components which may be included in the negative active mass is disclosed below. While a specific example is provided, variations thereon may be made without departing from the overall scope of the present invention.

| Material | % in Blend |
| --- | --- |
| BaSO4 | 50-60% |
| Organic 1 - oxylignin 1 | 10-20% |
| Organic 2 - oxylignin 2 | 5-15% |
| Carbon/Carbonaceous Material | 12-22% |

As is understood, the individual values (% in Blend) may be provided in a combination which totals 100%. While specific individual components are described above, individual components may be varied or substituted with materials having similar properties. Alternatively, weight percent loading of the components may also be varied. Likewise, alternative negative mass recipes may also be provided which accomplish the objectives described herein.

A synergy exists between the additive components such that when used in the appropriate proportions there is an improvement in the overall battery performance, above the expected effect of the individual components when used singly. For example, it is believed that some interaction occurs between the high surface area carbon black and the organics, such as but not limited to, absorption of the organic by the carbon. More specifically, there may be chemical or physical interactions between the additive components (i.e. the adsorption of some organic molecules on the carbon surface, or in another example, a more effective dispersion of the carbon and barium sulfate particles by the organic component). Likewise, advantageously, fine particle barium sulfate produces a greater number of small lead sulfate crystals during discharge. In turn, these small lead sulfate crystals dissolve more easily during charge than large lead sulfate crystals, leading to an improvement in charge acceptance and sustainable cyclability.

A negative paste formed with one or more of the foregoing may have any one or more of the following properties. Depending on the proportions of water and sulfuric acid added, the density of the negative paste after mixing can be from 4.0 to 4.8 g/cm3, for example, specifically 4.25 to 4.35 g/cm3 or 4.55 to 4.70 g/cm3. After electrochemical formation the active mass density may range from 4.1 to 4.3 g/cm3, for example, specifically 4.15 to 4.25 g/cm3. With a formed active material the paste porosity may range from 48% to 53% of volume.

Figure 9:
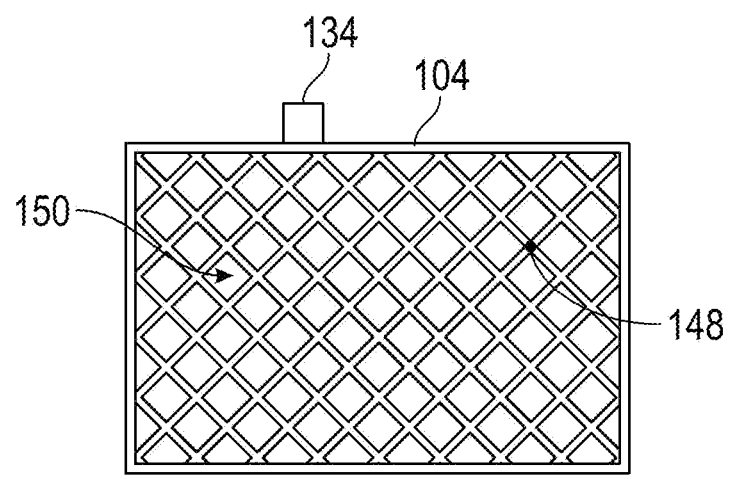
FIG. 9 is an elevation view of one or more examples of a plate or electrode having an imprint on the plate surface.

In addition to the foregoing, in one or more examples of embodiments, the pasted plates 104 and/or 106 (with or without surface scrim) may be imprinted, or have an imprint on the surface, to provide for example a plurality of grooves such as disclosed in United States Patent Publication No. 2015/0104715, the entire contents of which is hereby incorporated by reference in its entirety. As disclosed in said publication, the imprint or grooves may assist in electrolyte flow and air removal, among other benefits. In one or more examples, a "waffle" pattern surface treatment 150 of various grooves, such as shown in FIG. 9, may be provided on a plate surface 148, such as but not limited to, the positive plate 104. A plate surface treatment may also include a "riffle" or "knurled" pattern on the negative plate 106 (or in some embodiments the positive plate 104). In one or more examples, a pasting paper 132 may also be used, e.g. added to a plate 104, 106.

As indicated, separator material 108 may be provided between each positive plate 104 and negative plate 106. The separator 108 may be an absorbent glass mat or AGM, and in one or more examples of embodiments may be wrapped around a portion of, or interleaved with/provided between one (or both) of the positive and negative plates 104, 106. A single or double layer of AGM 108 may be employed. For example, a separator may be provided on the positive plate and an AGM 108 may also be employed with the positive/negative plates. The absorbent glass mat 108 may be constructed similar to and/or of a similar material to a traditional absorbent glass mat separator, including thin glass fibers woven into a mat (or more commonly non-woven deposited fibers). However, variations thereon which accomplish the purposes disclosed herein may also be acceptable. In one or more examples of embodiments, a thin glass scrim or mat may be provided on the positive plate.

An electrolyte, which is typically sulfuric acid, may be included in the battery 100.

In one or more alternative examples of embodiments, various additional/alternative elements of the AGM lead-acid battery may be improved or changed to achieve the desired performance, including but not limited to changes in separator composition, changes in polymer for the battery container 114, and/or other new or alternative components.

Accordingly, a battery 100 as described in one or more examples of embodiments herein includes a novel negative paste recipe and/or paste components. In some examples of embodiments, the foregoing is used in association with an absorbent glass mat. However, it is contemplated that a lead acid battery having one or more of the foregoing components may be provided without an absorbent glass mat, and instead with a separator. In some examples of embodiments, an absorbent glass mat may be provided in addition to the separator or in place of the separator. A scrim may also be provided, as well as an imprinted pattern on a plate and/or scrim surface.

Advantageously, a battery 100 having the features described herein has improved performance. For example, a performance improvement has been demonstrated in endurance (50% depth of discharge cycling, J2801 life test), dynamic charge acceptance, cold cranking, partial state-of-charge cycling (where the battery is intentionally operated at a state of charge lower than 100%) important for urban driving where the engine is stopped while the vehicle is stationary. These performance gains reflect the ability of the battery to resist irreversible sulfation of the negative plate when the additives are present in the correct ratio. Another advantage is reduced water loss at under hood temperatures.

EXAMPLES

The following Examples are an illustration of one or more examples of embodiments of carrying out the invention and are not intended as to limit the scope of the invention.

Referring to FIGS. 10-16, as can be seen batteries having the various expander recipes in the negative active mass were tested and data obtained. Through experimentation, performance improvements over control have been demonstrated in endurance (50% depth of discharge cycling), static charge acceptance, reserve capacity, cold cranking, partial state-of-charge cycling (17.5% where the battery is intentionally operated at a state of charge lower than 100%, important for urban driving where the engine is stopped while the vehicle is stationary), and improved (lower) water consumption.

For example, as can be seen in a review of FIGS. 10-16, those expander mixtures or formulas which included two oxylignins, such as described herein above, had a lower water consumption as compared to a control which did not include two oxylignins, and also maintained or improved electrical performance.

Example 1

Referring to FIG. 10, the composition or formulas of various expander recipes of the negative active mass tested are shown. As can be seen, each formula included the same amount of lead oxide and polymer fibers, but varying amounts of oxylignins, humic acid, fine particle barium sulfate, and carbonaceous material. Using these compositions or formulas, weight percent ranges were explored for the organic and carbonaceous components.

Example 2

Batteries having the compositions or formulas shown in FIG. 10 were subjected to electrical testing according to various industry standard tests. Initial electrical test data is shown in FIG. 11. As can be seen in FIG. 11, the alternatives "New B," "New C," and "New D" which included differing weight percents of two different oxylignins and at least one carbonaceous material in the negative active mass showed improved performance over the control, with New C illustrating the best performance. As can be seen in FIG. 11, batteries having the negative active mass composition or formulas shown in New B, New C, and New D performed at the same level or better than the control. New C showed excellent endurance at 17.5% cycling, a life test (J2801) which lasted 7 weeks longer than the control, and water consumption at 2.05 versus the control which failed.

Example 3

Figure 12:
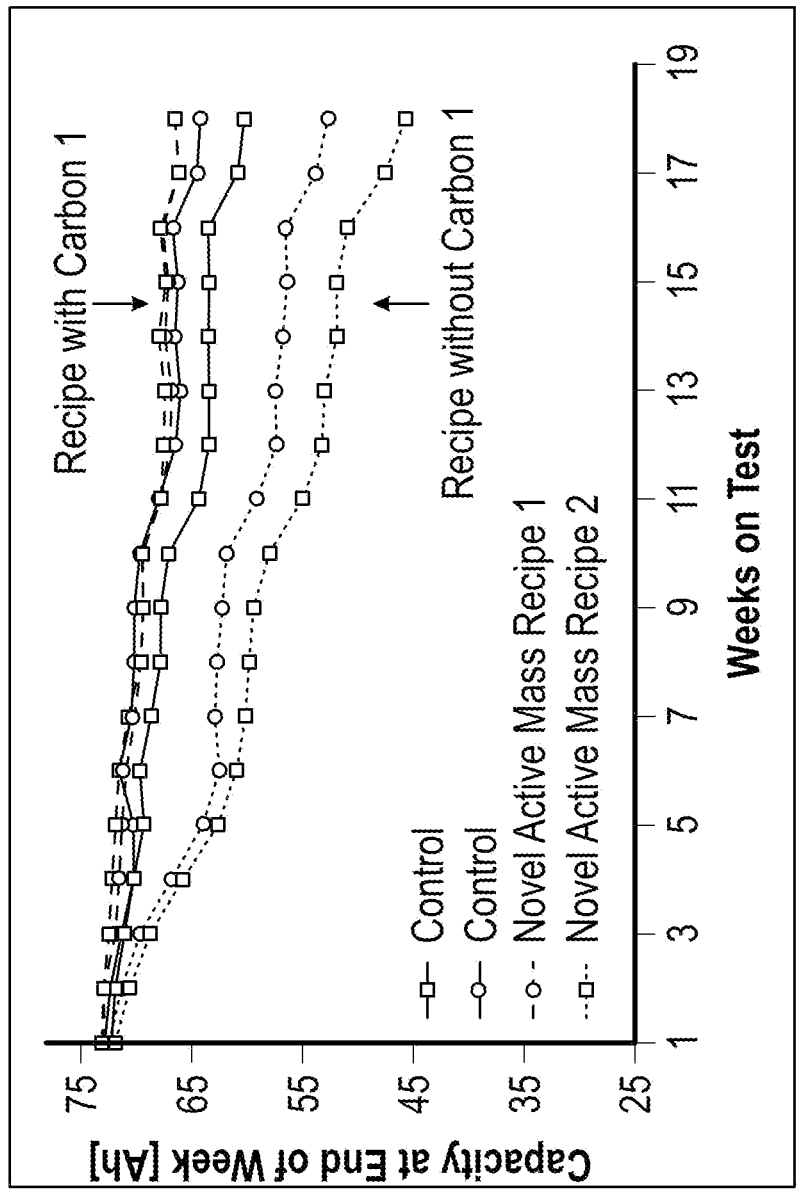
FIG. 12 is a graph showing the results of electrical tests, AK3.4 @25 degrees Celsius on H6 (70 Ah, 760 A) batteries having two different carbonaceous materials in the novel negative active mass formula described herein.

FIG. 12 shows the results of electrical tests, AK3.4 @25 degrees Celsius on H6 (70 Ah, 760 A) batteries having two different carbonaceous materials in the novel negative active mass formula described herein. The results illustrate variations in cycling endurance, against a reference battery or control. As can be seen, the batteries have a capacity between approximately 73 Ah at the end of the first week, and decrease, gradually, over the course of 19 weeks. At approximately the end of the $19^{th}$ week, the recipe having carbon 1 had a capacity above the reference battery, of approximately 70 Ah, while the recipe without carbon 1 had a capacity below the reference battery, ranging from approximately 45 to 55 Ah.

Example 4

Figure 13:
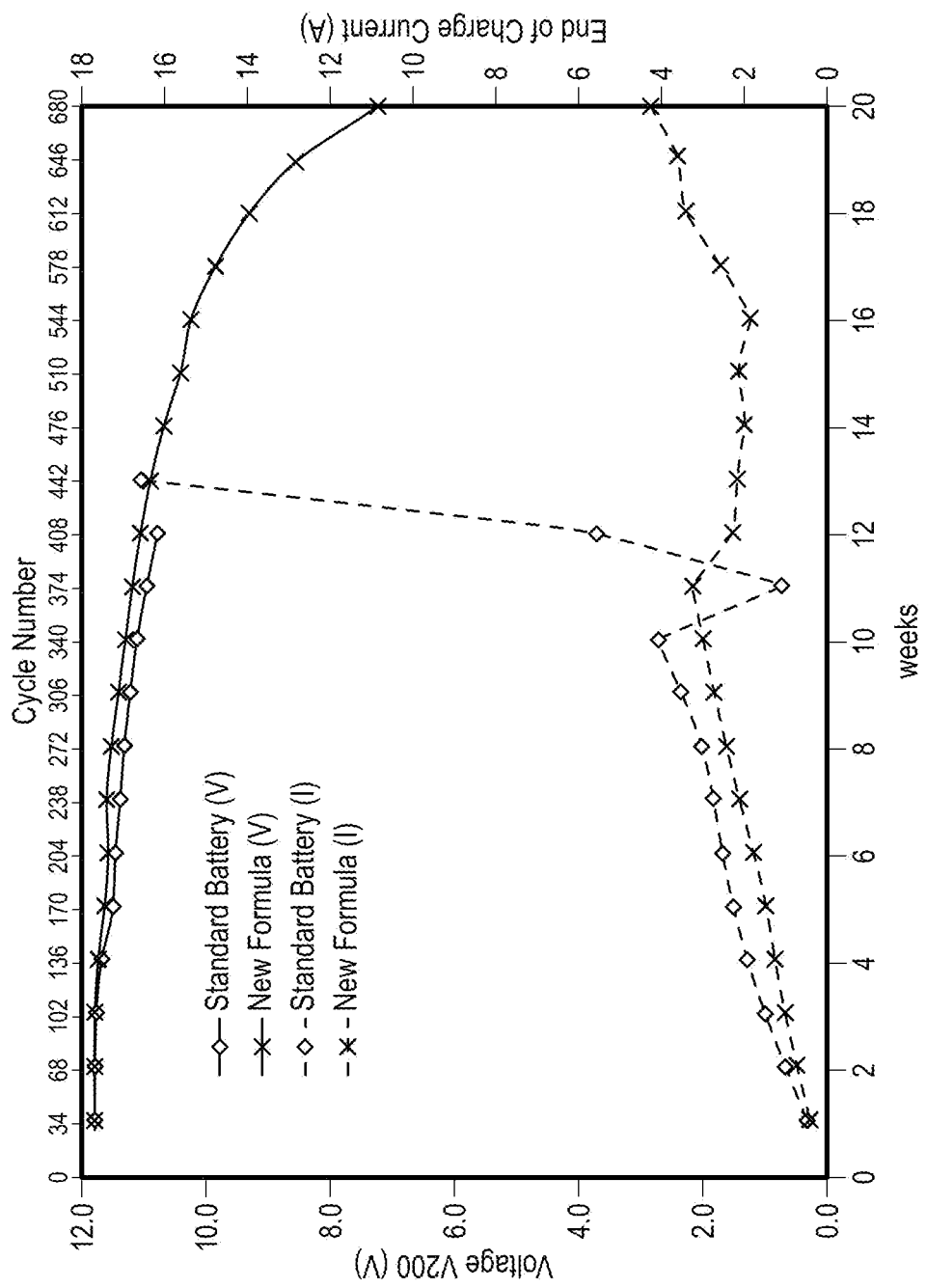
FIG. 13 is a graph showing the results of twenty weeks of high temperature endurance testing performed using the SAE J2801 Endurance Cycle test at 75 degrees Celsius.

FIG. 13 shows the results of twenty weeks of high temperature endurance testing. Testing was performed using the SAE J2801 Endurance Cycle test at 75 degrees Celsius. Standard batteries were tested against batteries having the novel negative active mass formula described herein. As can be seen in FIG. 13, the standard battery maintained voltage performance for approximately 10-11 weeks before failing, while the battery having the novel formula maintained voltage and performance nearly 20 weeks without a significant drop off in performance.

Example 5

Figure 14:
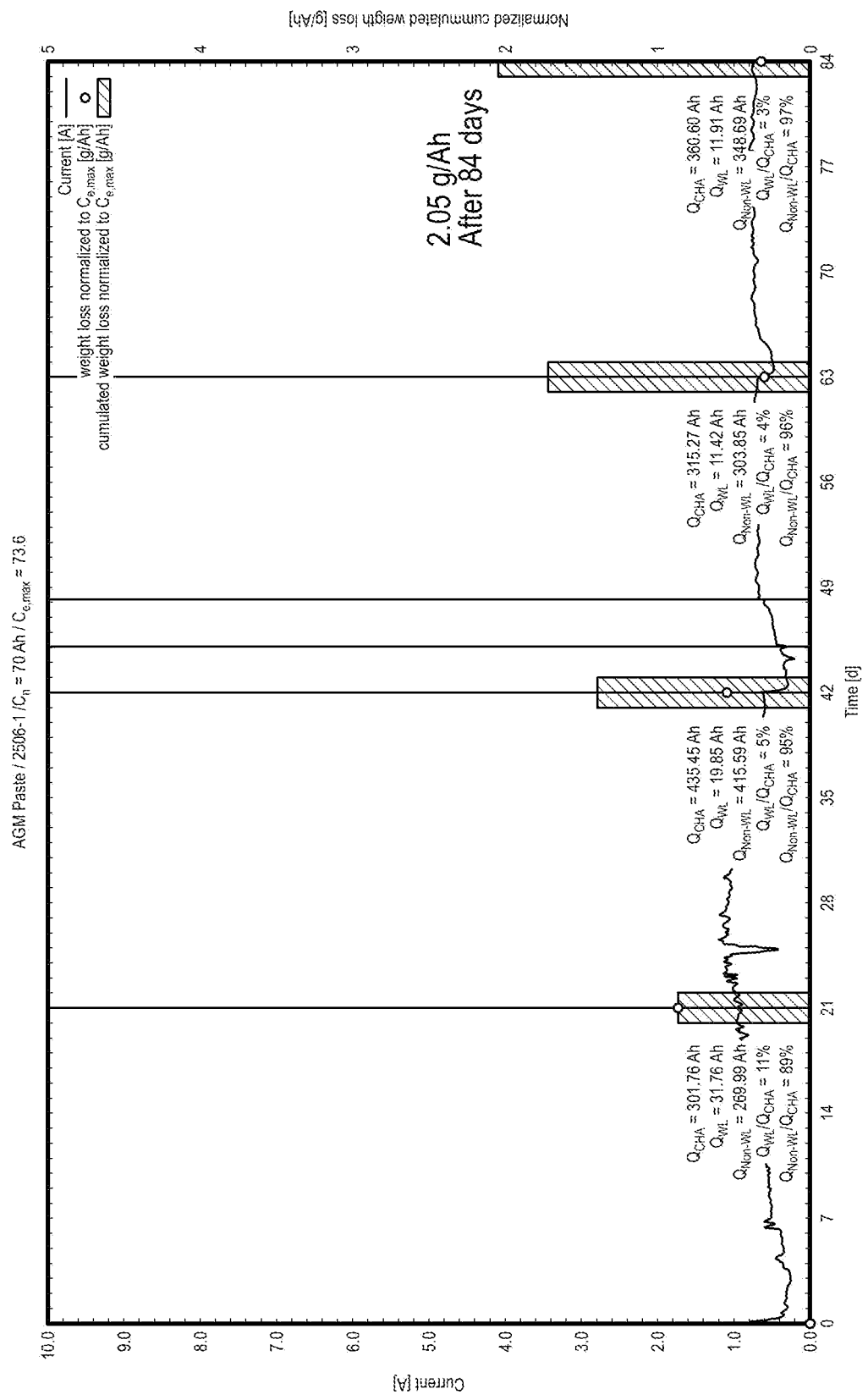
FIG. 14 is a graph illustrating the results of an EN50342-1 Water Consumption test at 60 degrees Celsius.

A water consumption test was also performed on batteries having the novel negative active mass formula described herein. Specifically, an EN50342-1 Water Consumption test at 60 degrees Celsius was performed. The results are shown in FIG. 14. As can be seen, the normalized accumulated weight loss for the battery was 2.05 g/Ah after 84 days.

Example 6

Figure 15:
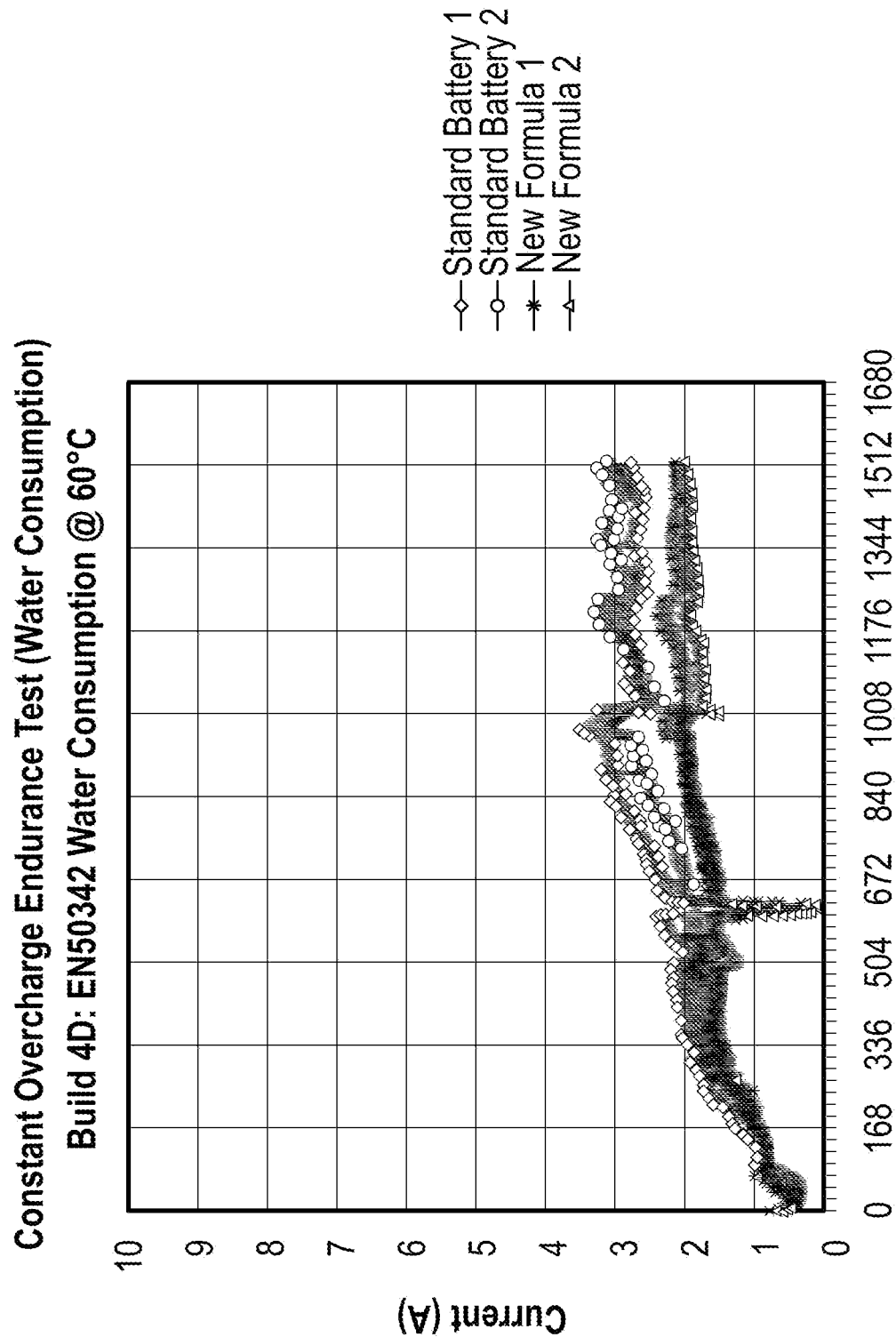
FIG. 15 is a graph showing the results of an EN50342 Water Consumption test at 60 degrees Celsius, showing the resultant water consumption during a constant overcharge endurance test.

A constant overcharge endurance test was performed to determine water consumption in batteries having the novel negative active mass formula described herein. Specifically, an EN50342 Water Consumption test at 60 degrees Celsius was performed. Referring to FIG. 15, two standard batteries were tested against two batteries having the novel formula. Testing included measuring current (amps) over time (hours). As can be seen, the batteries having the novel formula had lower current over the time span of the test.

Example 7

Figure 16:
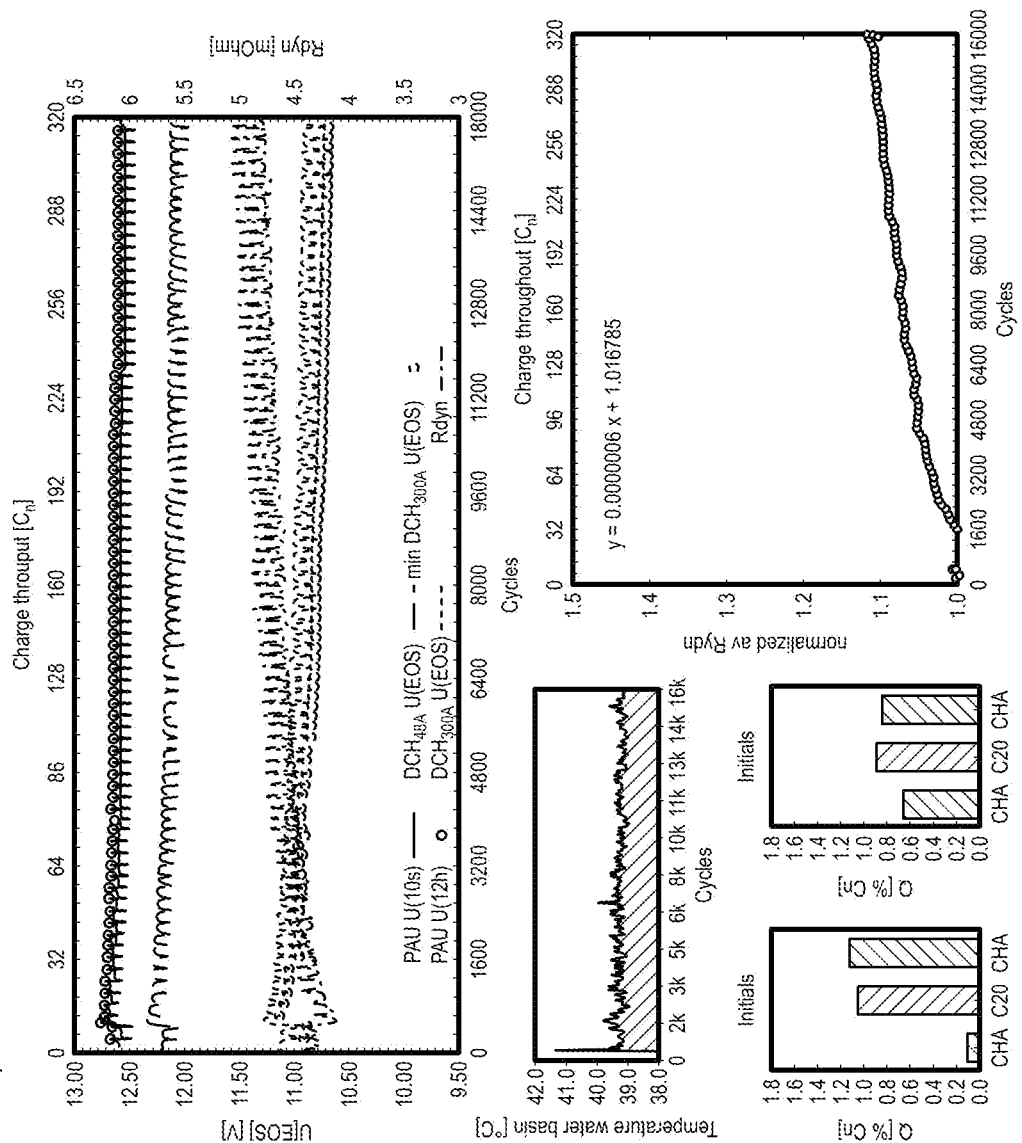
FIG. 16 shows the results of a Micro Hybrid Test (MHT), EN50342-6, performed on batteries having the novel negative active mass formula disclosed herein.

A Micro Hybrid Test (MHT), EN50342-6 was performed on the novel negative active mass formula disclosed herein. The MHT test illustrates cycling performance. An H6 AGM battery with a nominal capacity of 70 Ah, having the novel negative active mass formula described herein was tested for 200 cycles at 40 degrees Celsius. The results, showing improved cycling performance, are shown in FIG. 16.

While specific examples are shown, one of skill in the art will recognize that these are examples only and variations thereon may be made without departing from the overall scope of the present invention.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that references to relative positions (e.g., "top" and "bottom") in this description are merely used to identify various elements as are oriented in the Figures. It should be recognized that the orientation of particular components may vary greatly depending on the application in which they are used.

For the purpose of this disclosure, the term "coupled" means the joining of two members directly or indirectly to one another. Such joining may be stationary in nature or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

It is also important to note that the construction and arrangement of the system, methods, and devices as shown in the various examples of embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements show as multiple parts may be integrally formed, the operation of the interfaces may be reversed or otherwise varied, the length or width of the structures and/or members or connector or other elements of the system may be varied, the nature or number of adjustment positions provided between the elements may be varied (e.g. by variations in the number of engagement slots or size of the engagement slots or type of engagement). The order or sequence of any process or method steps may be varied or re-sequenced according to alternative embodiments. Other substitutions, modifications, changes and omissions may be made in the design, operating conditions and arrangement of the various examples of embodiments without departing from the spirit or scope of the present inventions.

While this invention has been described in conjunction with the examples of embodiments outlined above, various alternatives, modifications, variations, improvements and/or substantial equivalents, whether known or that are or may be presently foreseen, may become apparent to those having at least ordinary skill in the art. Accordingly, the examples of embodiments of the invention, as set forth above, are intended to be illustrative, not limiting. Various changes may be made without departing from the spirit or scope of the invention. Therefore, the invention is intended to embrace all known or earlier developed alternatives, modifications, variations, improvements and/or substantial equivalents.

The technical effects and technical problems in the specification are exemplary and are not limiting. It should be noted that the embodiments described in the specification may have other technical effects and can solve other technical problems.

We claim:

1. A blended expander formula for use in preparation of lead acid battery electrodes, comprising: fine particle barium sulfate with a particle size of 0.2 to 1.1 micrometers for mean D50, a first expander being a first oxylignin having a first molecular weight is 0.1 wt % to 0.25 wt % with respect to a leady oxide weight, a second expander being a second oxylignin having a second molecular weight is 0.1 wt % to 0.25 wt % with respect to a leady oxide weight with the second molecular weight being different from the first molecular weight, and a carbonaceous material.

2. The blended expander formula of claim 1, wherein the first oxylignin has a molecular weight in a first range of 1500 to 3500 g/mol.

3. The blended expander formula of claim 1, wherein the second oxylignin has a molecular weight in a second range of 5000 to 15000 g/mol.

4. The blended expander formula of claim 1, wherein the carbonaceous material has a high specific surface area of 80 to 265 $m^2/g$ and is selected from the group consisting of carbon black, graphite, and graphene.

5. The blended expander formula of claim 4, wherein the carbonaceous material comprises two different carbon materials.

6. The blended expander formula of claim 1, comprising a range of 50-60 percent fine particle barium sulfate, a range of 10-20 percent the first oxylignin, a range of 5-15 percent the second oxylignin, and 12-22 percent the carbonaceous material.

7. The blended expander formula of claim 1, wherein fine barium sulfate particle size ranges from 0.2-1.1 micrometers.

8. An active material paste for use in a negative electrode of a lead-acid absorbent glass mat battery, comprising: water, leady oxide, polymer fiber, sulfuric acid, and a blend comprising fine particle barium sulfate with a particle size of 0.2 to 1.1 micrometers for mean D50, a first expander being a first oxylignin having a first molecular weight is 0.1 wt % to 0.25 wt % with respect to a leady oxide weight, a second expander being a second oxylignin having a second molecular weight is 0.1 wt % to 0.25 wt % with respect to a leady oxide weight with the second molecular weight being different from the first molecular weight, and a carbonaceous material.

9. The active material paste of claim 8, wherein the first oxylignin has a molecular weight in a first range of 1500 to 3500 g/mol, and wherein the second oxylignin has a molecular weight in a second range of 5000 to 15000 g/mol.

10. The active material paste of claim 8, wherein the carbonaceous material has a high specific surface area and is selected from the group consisting of carbon black, graphite, and graphene, and wherein the carbonaceous material comprises two different carbon materials.

11. The active material paste of claim 8, comprising a range of 50-60 percent fine particle barium sulfate, a range of 10-20 percent the first oxylignin, a range of 5-15 percent the second oxylignin, and 12-22 percent the carbonaceous material.

12. The active material paste of claim 8, wherein the active material paste has any one or more of the following properties: a density of a negative paste after mixing ranges from 4.0 to 4.8 $g/cm^3$; an active material density ranges from 4.1 to 4.3 $g/cm^3$ after electrochemical formation; and a formed active material a paste porosity ranges from 48% to 53% of volume.

13. A negative electrode for use in a lead-acid absorbent glass mat battery, comprising a current collector and negative paste in contact with the current collector, the negative paste comprising water, leady oxide, polymer fiber, sulfuric acid, and a blend comprising fine particle barium sulfate with a particle size of 0.2 to 1.1 micrometers for mean D50, a first expander being a first oxylignin having a first molecular weight is 0.1 wt % to 0.25 wt % with respect to a leady oxide weight, a second expander being a second oxylignin having a second molecular weight is 0.1 wt % to 0.25 wt % with respect to a leady oxide weight with the second molecular weight being different from the first molecular weight, and a carbonaceous material.

14. The negative electrode of claim 13, wherein the first oxylignin has a molecular weight in a first range of 1500 to 3500 g/mol, and wherein the second oxylignin has a molecular weight in a second range of 5000 to 15000 g/mol.

15. The negative electrode of claim 13, wherein the carbonaceous material has a high specific surface area and is selected from the group consisting of carbon black, graphite, and graphene, and wherein the carbonaceous material comprises two different carbon materials.

16. The negative electrode of claim 13, comprising a range of 50-60 percent fine particle barium sulfate, a range of 10-20 percent the first oxylignin, a range of 5-15 percent the second oxylignin, and 12-22 percent the carbonaceous material.

17. A lead-acid battery comprising:
a container with a cover, the container including one or more compartments;
one or more cell elements in the one or more compartments, the one or more cell elements comprising:
a positive electrode, the positive electrode having a positive current collector and a positive active material in contact with the positive current collector;
a negative electrode, the negative electrode having a current collector and negative paste in contact with the current collector, the negative paste comprising water, leady oxide, polymer fiber, sulfuric acid, and a blend comprising fine particle barium sulfate, with a particle size of 0.2 to 1.1 micrometers for mean D50, a first expander being a first oxylignin having a first molecular weight, is 0.1 wt % to 0.25 wt % with respect to a leady oxide weight a second expander being a second oxylignin having a second molecular weight is 0.1 wt % to 0.25 wt % with respect to a leady oxide weight, which is different from the first molecular weight, and a carbonaceous material; and
an absorbent glass mat separator between the positive electrode and the negative electrode;
electrolyte within the container; and
one or more terminal posts extending from the container or the cover and electrically coupled to the one or more cell elements.

18. A blended expander formula for use in preparation of lead acid battery electrodes, comprising: fine particle barium sulfate with a particle size of 0.2 to 1.1 micrometers for mean D50 at an amount of 0.2 wt % to 0.4 wt % with respect to a leady oxide weight, a first organic expander comprising a first oxylignin having a first molecular weight between 2,000 g/mol and 3,000 g/mol at an amount of 0.1 wt % to 0.25 wt % with respect to a leady oxide weight, a second organic expander comprising a second oxylignin having a second molecular weight between 9,000 g/mol and 15,000 g/mol of 0.1 wt % to 0.25 wt % with respect to a leady oxide weight which is different from the first molecular weight, and a carbonaceous material.

* * * * *